3,655,769
OXIDATION OF n-PARAFFINS
Matthew A. McMahon, Wappingers Falls, N.Y., assignor to Texaco Inc., New York, N.Y.
No Drawing. Filed Sept. 25, 1967, Ser. No. 670,374
Int. Cl. C07c 45/02, 31/00
U.S. Cl. 260—597      7 Claims

ABSTRACT OF THE DISCLOSURE

A method of oxidizing n-paraffins of between about 6 and 20 carbons having an ultraviolet light absorbancy of at least about 1 at 260–280 m$\mu$ to produce oxidates rich in secondary alkanols comprising contacting said n-paraffin with oxygen in the presence of between about .001 and 5 wt. percent of a peroxide selected from the group consisting of t-butyl hydroperoxide and di-t-butyl peroxide and between about 1 and 15 wt. percent of a boron compound selected from the group consisting of boric oxide, boric acid and alkyl metaborate of between about 3 and 15 carbons, said wt. percent based on said n-paraffin.

BACKGROUND OF INVENTION

Field of invention

A process directed to the partial oxidation of predominantly non-aromatic hydrocarbon and hydrocarbon mixtures to produce a mixture of products, for example, esters, acids, aldehydes, ketones and particularly secondary alcohols.

Description of the prior art

In the past, one of the standard methods of manufacturing oxygenated products containing a significant alcohol content is set forth in U.S. 1,947,989 which teaches contacting paraffinic hydrocarbons with oxygen in the presence of oxidation catalyst of boric acid or boric oxide to form hydrocarbon oxidates and borate esters and converting the borate esters into alcohols through hydrolysis. U.S. 2,626,277 discloses the manufacture of higher fatty acids and higher alcohols by contacting petroleum wax with oxygen in the presence of organic peroxides having boiling points greater than 300° F. The patent states cumene hydroperoxide is an excellent example and lower peroxides such as di-t-butyl peroxide are unsuitable. U.S. 2,726,255 discloses a method of preparing fatty alcohols from aliphatic hydrocarbon of from 7 to 12 carbons by contacting the hydrocarbon, e.g., dodecane with oxygen in the presence of a hydroperoxide such as t-butyl hydroperoxide or cumene hydroperoxide and an alkaline agent such as sodium hydroxide and further discloses the hydrogenation of the product to upgrade in respect to the production of alcohol.

Although the prior methods were effective in producing oxygenated products they are ineffective in producing oxygenates in the presence of the combination of boric anhydride, boric acid or an alkyl metaborate and cyclic hydrocarbons such as naphthalene, alkyl naphthalenes, and tetralin registering an ultraviolet light (UV) absorbancy in the 260–280 m$\mu$ range. The combination of the aforementioned cyclic hydrocarbons and boron compounds functions as a strong oxidation inhibitor, particularly in the oxidation of n-paraffin. This fact previously resulted in the requirement of relatively expensive and time consuming pretreating of the n-paraffin to remove the oxidation inhibiting cyclic hydrocarbon impurity therefrom. Therefore, there was a need in the n-paraffin oxidation art to develop a method which would permit oxidation of n-paraffin using the boric anhydride, boric acid or alkyl metaborate oxidation directors and not require the prior removal of the oxidation inhibiting cyclic hydrocarbon.

SUMMARY OF THE INVENTION

I have discovered and this constitutes my invention an n-paraffin oxidation procedure which employs the aforementioned boron oxidation directors and which does not require the pretreatment of the n-paraffin reactant to remove oxidation inhibiting cyclic hydrocarbons. More specifically, I have discovered a method of oxidizing n-paraffin having an ultraviolet light absorbancy at 260–280 m$\mu$ of at least about 1 and up to 560 or more to produce an oxygenated product consisting primarily of secondary alkanol and aliphtaic ketones utilizing an oxidation director favoring the manufacture of secondary alcohols in which the inhibiting effect of the 260–280 m$\mu$ cyclic hydrocarbon impurities in the n-paraffin reactant in combination with such oxidation director is effectively suppressed. Still more specifically, the invention comprises a method for producing oxygenated derivatives particularly rich in secondary alcohols comprising contacting a 6 to 20 carbon atom n-paraffin having an ultraviolet light absorbancy of between about 1 and 560 at 260–280 m$\mu$ with oxygen in the presence of a boron compound selected from the group consisting of boric oxide, boric acid and an alkyl metaborate of from 3 to 15 carbons and a peroxide selected from the group consisting of di-t-butyl peroxide and t-butyl hydroperoxide.

In brief background absorbance (A) is related to the concentration of the absorber, e.g., oxidation inhibiting cyclic hydrocarbons in the 260–280 m$\mu$ range such as naphthalene, methyl naphthalene and butyl naphthalene in the following way:

$$A = \epsilon c l$$

where

A = absorbance
$\epsilon$ = extinction coefficient
c = concentration in gram moles
l = cell pathlength in centimeters (usually 1 cm.)

A is measured by means of a standard spectrophotometer such as a Cary Model 14M Recording Spectrophotometer. The sample to be tested for absorbance is placed in a special silica cell and its absorbance is measured against that of a pure reference solvent (e.g. isooctane) which does not absorb in the same region as the sample solution. The $\epsilon$ is a constant characteristic of the compounds being studied. The $\epsilon$ values for various compounds are available in the literature. Further discussion of ultraviolet light absorbancy is found in E. A. Brande, "Determination of Organic Structures by Physical Methods," pp. 131–194, Academic Press, New York, 1955.

In detail, the method comprises contacting under liquid phase conditions, n-paraffin and mixtures thereof from 6 to 20 carbons having an ultraviolet light absorbancy at 260–280 m$\mu$ of between about 1 and 560 with oxygen at a temperature between about 150 and 200° C., preferably between about 165 and 185° C., in the presence between about 1 and 15 wt. percent based on said n-paraffin of a boron compound selected from the group consisting of boric oxide, boric acid and alkyl metaborate of from 3 to 15 carbons and between about 0.001 and 5.0 wt. percent based on said n-paraffin of a peroxide selected from the group consisting of di-t-butyl peroxide and t-butyl hydroperoxide. The contacting is normally conducted for a period of between about 1 and 6 hours and preferably until between 5 and 50 wt. percent of the n-paraffin reactant is converted into oxygenates. The oxygen is advantageously introduced into the reaction system at a rate of at least about 5 mls./min./100 g.

paraffin, preferably between about 10 and 150 mls./min./100 g. paraffin.

One of the critical features of the invention is the employment of t-butyl hydroperoxide or di-t-butyl hydroperoxide. When closely related peroxides and hydroperoxides are substituted for the peroxide material contemplated herein in the method of the invention, little or no oxidation takes place. Another important feature is to utilize a peroxide amount of at least about 0.001 wt. percent based on the n-paraffin reactant. Lower quantities produce a significantly reduced amount of desired oxidation products. Another essential feature of the invention is the use of boric oxide, boric acid or an alkyl metaborate as defined. In the absence of the contemplated boron compounds the yield of the desired secondary alkanols is sharply reduced.

The oxidation products are recovered from the reaction mixture by standard means such as selective solvent extraction, fractional distillation and combinations thereof. One such method of purification to recover secondary alcohol calls for contacting the final reaction mixture with water and separating the resultant organic phase therefrom, saponifying the organic phase with an aqueous alcoholic solution of alkali metal, separating the saponified organic layer and subjecting the residue to fractional distillation to recover the desired secondary alkanol product.

Examples of the normal paraffins contemplated herein are those of 6 to 20 carbons recovered from crude petroleum stocks. This recovery is usually accomplished by first obtaining a cut via distillation or other means having the desired number of carbon atoms and then treating the desired fraction in a variety of ways to obtain a predominant amount of n-paraffin. Such treatment methods such as urea adduction or the employment of molecular sieves are illustrative. These standard methods produce n-paraffin products with impurity amounts, e.g., between about 0.001 and 1.0 wt. percent of oxidation inhibiting aromatics and derivatives thereof giving the n-paraffin product an ultraviolet light absorbancy of between about 1 and 560 and 260–280 m$\mu$. Specific examples of the n-paraffin reactants contemplated are dodecane having a naphthalene content of between about 99.0 and 99.999 wt. percent and a $C_{10}$, $C_{11}$, $C_{12}$, $C_{13}$ and $C_{14}$ n-paraffins and mixtures thereof containing between about 0.001 and 1.0 wt. percent naphthalene, methyl naphthalene, ethyl naphthalene, butyl naphthalene, or tetralin and mixtures thereof.

Autogenous pressure is satisfactory although higher or lower pressures may be employed.

Although pure oxygen may be employed in the reaction, it is preferred to employ air or synthetic mixtures of oxygen diluted with any inert gas such as nitrogen, helium and argon.

Examples of the catalytic metaborate oxidation directors contemplated herein are butyl metaborate, isooctyl metaborate and dodecyl metaborate. The term "boric acid" hereinbefore and hereinafter denotes all hydrated forms of boric oxide such as orthoboric acid, metaboric acid.

Examples of the oxygenated products resulting from the oxidation of n-paraffin such as n-dodecane are 2-dodecanol and all other isomeric secondary alcohols obtained from a dodecane. In addition, isomeric dodecanones, organic acids such as pentanoic acids and esters such as dodecyl propionate can also be obtained as products of the oxidation of dodecane. Examples of the oxygenated products resulting from the oxidation of a mixture of $C_{10}$–$C_{14}$ n-paraffins are 2-decanol, 2-undecanol, 2-dodecanol, 2-tridecanol, and all other isomeric secondary alcohols obtainable from a mixture of $C_{10}$–$C_{14}$ n-paraffins.

The temperature of the reaction as heretofore stated should be maintained at between about 150 and 200° C. and advantageously above the melting point of the n-paraffinic reactant.

The following examples further illustrate the invention but are not to be interpreted as limitations thereof.

EXAMPLE I

This example illustrates the preparation of the butyl metaborate selective oxidation director.

A mixture of 62 (1 mole) of boric acid and 72 grams (1 mole) of n-butanol was charged to a 500 mls. glass flask equipped with a magnetic stirrer, thermometer and a 6 inch helix pack column. The mixture was heated at 110 to 122° C. until about 30 mls. of water were collected from the distillate. All of the butanol layer of the distillate was recycled back to the reactor pot and the mixture was then heated at 121–138° C. until a total of 32 mls. of water was collected. The product was determined to be n-butyl metaborate.

EXAMPLE II

This example illustrates the method of the invention and the importance of employing t-butyl hydroperoxide or di-t-butyl peroxide oxidation inhibitor suppressors in the method of the invention.

To a 300 ml. 3-necked flask, fitted with a thermometer, fritted glass sparging device, stirrer and water separator, there was charged the n-paraffin reactant, boric acid or n-butyl metaborate and peroxide. The reactor was heated to 175° C. and air was passed through the reaction mixture via introduction through the gas sparging device. The course of the reaction was followed by periodically withdrawing 5 or 10 mls. samples from the reaction by means of a pipet. The sample was added directly to 10 or 15 mls. of water and stirred at 100° C. for 30 minutes. The solution was then cooled and the layers were separated. If n-dodecane was the charge the aqueous layer was extracted with 5 or 10 mls. of benzene. The benzene extract and the organic layer were then combined, dried over anhydrous calcium sulfate and analyzed by gas chromotography. If th mixed $C_{10}$–$C_{14}$ n-paraffins were charged, the benzene extraction step was omitted.

The test data and results are reported in subsequent Tables I and II. All runs were made at 175° C. using an air rate of 150 mls./min./100 grams of n-paraffin. Unless otherwise stated, the ultraviolet light absorbance at 260–280 m$\mu$ of the n-dodecane charge stock was 4.7 and the $C_{10}$–$C_{14}$ n-paraffin mixture was 12.2.

TABLE I.—REACTION CONDITIONS

| Run number | Paraffin, g. | Butyl metaborate, g. | Peroxide, g.[a] | Time, hrs. |
|---|---|---|---|---|
| A[1] | n-$C_{10}$, 100 | 8 | —, 0 | 2 |
| B[1] | n-$C_{12}$, 300 | 24 | —, 0 | 28 |
| C | n-$C_{12}$, 70 | 6 | TBH, .018 | 2 |
| D | n-$C_{12}$, 100 | 8 | TBH, .05 | 2 |
| E | n-$C_{12}$, 100 | 6 | TBH, .103 | 2 |
| F [b] | n-$C_{12}$, 100 [b] | 8 | TBH, 0.110 | 2 |
| G | n-$C_{12}$, 70 | 6 | DTBP, .0294 | 2 |
| H [c] | n-$C_{10}$–$C_{14}$, 100 | 8 | TBH, 0.45 | 2 |
| I [1] | n-$C_{10}$–$C_{14}$, 100 | $H_3BO_3$, 8 | TBH, .027 | 2 |
| J [1] | n-$C_{10}$–$C_{14}$, 100 | $H_3BO_3$, 8 | —, 0 | 2 |
| K [1] | n-$C_{12}$, 100 | 8 | SBH, 0.028 | 2 |
| L [d] | n-$C_{12}$, 100 | 8 | NOH, 0.1 | 4 |
| M [e] | n-$C_{12}$, 100 | 8 | TH, 0.1 | 4 |
| N [1] | n-$C_{12}$, 100 | 8 | CH, 0.05 | 2 |
| O [1] | n-$C_{12}$, 100 | 8 | BP, 0.1 | 2 |

[1] Control.
[a] TBH=t-butyl hydroperoxide; DTBH=di-t-butyl peroxide; SBH=sec-butyl hydroperoxide; NOH=n-octyl hydroperoxide; TH=tetralin hydroperoxide; CH=cumene hydroperoxide; BP=benzoyl peroxide.
[b] Artificial charge stock prepared by dissolving 0.6 g. of naphthalene in 1 liter of aromatic-free n-dodecane. Ultraviolet light absorbance at 260–280 m$\mu$ was calculated to be 26.2.
[c] Before introduction of oxygen, mixture was preheated for 3 hours at 140° C. and then oxidized for 2 hours at 175° C.
[d] The hydroperoxide was added in two equal portions. The first was added and the mixture was oxidized in the usual manner. The second was added and the mixture was heated at 100° C. for 2 hours followed by 2 hours of oxidation at 175° C.
[e] Half hydroperoxide added initially and half after two hours of oxidation.

TABLE II.—REACTION RESULTS

| Run number, i.e. | n-Paraffin, wt. percent | Total alcohol plus ketone, wt. percent | Alkanol, wt. percent [2] | Alkanone, wt. percent [2] |
|---|---|---|---|---|
| A [1] | 99.6 | 0.4 | 0.4 | 0 |
| B [1] | 99.7 | 0.3 | 0.3 | 0 |
| C | 84.9 | 15.1 | 14.4 | 0.7 |
| D | 81.6 | 18.2 | 17.7 | 1.1 |
| E | 82.7 | 6.34 | 16.3 | 1.04 |
| F | 88.9 | 19.1 | 16.7 | 1.4 |
| G | 83.5 | 16.5 | | |
| H | 95.2 | 4.8 | | |
| I | 86 | 14 | | |
| J [1] | 94 | 6 | | |
| K [1] | 99.5 | 0.5 | | |
| L [1] | 99.9 | 0.1 | | |
| M [1] | 100 | 0 | | |
| N [1] | 99.5 | 0.5 | | |
| O [1] | 99.1 | 0.9 | | |

[1] Control.
[2] When the n-paraffin was dodecane the alknaol was predominantly sec.-dodecanol and the alkanone was predominantly dodecanone. When the n-paraffin was a $C_{10}$-$C_{14}$ the alkanol was predominantly a mixture of $C_{10}$-$C_{14}$ sec.-alkanols and the alkanone was predominantly a mixture of $C_{10}$-$C_{14}$ alkanones.

As can be seen from the foregoing tables in control runs A and B in which no peroxide was employed the yield of corresponding oxygenated product (alkanol and alkanone) was negligible. Control Runs K, L, M, N and O demonstrate the use of peroxides and hydroperoxides other than butyl hydroperoxide and di-tertiary peroxide in the method of the invention result in only negligible yields of oxygenated product. The remaining runs are representative of the method of the invention except for Run J which is a comparative control in respect to Run I.

I claim:

1. A method of oxidizing an n-paraffin composition of 6 to 20 carbons containing an impurity giving an ultraviolet light absorbancy to said composition of between about 1 and 560 at 260–280 m$\mu$, said impurity consisting essentially of a member selected from the group consisting of naphthalene, alkyl naphthalene where said alkyl group has from 1 to 4 carbons, tetralin and mixtures thereof, consisting of contacting said n-paraffin composition with oxygen at a temperature between about 150 and 200° C. in the presence of a boron compound selected from the group consisting of boric oxide, boric acid and an alkyl metaborate of from 3 to 15 carbons and a peroxide selected from the group consisting of t-butyl hydroperoxide and di-t-butyl peroxide, said boron compound being present in an amount of between 1 and 15 wt. percent based on said n-paraffin composition, and said peroxide being present in an amount of between about 0.001 and 5 wt. percent based on said n-paraffin composition.

2. A method in accordance with claim 1 wherein said contacting is continued for a period of time sufficient to convert between about 5 and 50 wt. percent of said paraffin into oxygenated derivative.

3. A method in accordance with claim 2 wherein said n-paraffin is n-dodecane, said boron compound is butyl metaborate and said peroxide is t-butyl hydroperoxide.

4. A method in accordance with claim 2 wherein said n-paraffin is a mixture of normal $C_{10}$, $C_{11}$, $C_{12}$, $C_{13}$ and $C_{14}$ alkanes, said boron compound is butyl metaborate and said peroxide is t-butyl hydroperoxide.

5. A method in accordance with claim 2 wherein said n-paraffin is n-dodecane, said boron compound is butyl metaborate and said peroxide is di-t-butyl peroxide.

6. A method in accordance with claim 1, wherein said n-paraffin is n-dodecane, said member is naphthalene, said boron compound is butyl metaborate and said peroxide is t-butyl hydroperoxide.

7. A method in accordance with claim 1 wherein said n-paraffin is a mixture of normal $C_{10}$, $C_{11}$, $C_{12}$, $C_{13}$ and $C_{14}$ alkanes, said boron compound is boric acid, and said peroxide is t-butyl hydroperoxide.

References Cited

FOREIGN PATENTS 1,463,011   11/1966   France _____ 260—632 CB

HOWARD T. MARS, Primary Examiner

U.S. Cl. X.R.

260—533 R, 608, 632 CB